US009034980B2

(12) United States Patent
Recker et al.

(10) Patent No.: US 9,034,980 B2
(45) Date of Patent: May 19, 2015

(54) PNEUMATIC TIRES FOR COMMERCIAL VEHICLES

(71) Applicant: Continental Reifen Deutschland GmbH, Hannover (DE)

(72) Inventors: Carla Recker, Hannover (DE); Philipp Koelle, Stuttgart (DE); Thomas Kramer, Herford (DE); Christoph Jocher, Garbsen (DE); Thorsten Torbruegge, Langenhagen (DE); Fabian Dettmer, Braunschweig (DE); Norbert Daldrup, Wiedenbruegge (DE)

(73) Assignee: Continental Reifen Deutschland GmbH, Hannover (DE)

(*) Notice: Subject to any disclaimer, the term of this patent is extended or adjusted under 35 U.S.C. 154(b) by 114 days.

(21) Appl. No.: 13/867,483

(22) Filed: Apr. 22, 2013

(65) Prior Publication Data
US 2013/0237659 A1 Sep. 12, 2013

Related U.S. Application Data

(63) Continuation of application No. PCT/EP2011/068075, filed on Oct. 17, 2011.

(30) Foreign Application Priority Data

Nov. 10, 2010 (EP) .................................... 10190627

(51) Int. Cl.
| | |
|---|---|
| *C08L 7/00* | (2006.01) |
| *C08L 25/02* | (2006.01) |
| *C08L 25/06* | (2006.01) |
| *C08L 9/00* | (2006.01) |
| *C08L 45/02* | (2006.01) |
| *C08L 47/00* | (2006.01) |
| *B60C 1/00* | (2006.01) |
| *C08L 57/02* | (2006.01) |
| *C08K 3/04* | (2006.01) |
| *C08K 3/36* | (2006.01) |
| *C08K 5/01* | (2006.01) |

(52) U.S. Cl.
CPC . *C08L 7/00* (2013.01); *C08L 45/02* (2013.01); *C08L 47/00* (2013.01); *C08L 25/02* (2013.01); *B60C 1/0016* (2013.01); *C08L 57/02* (2013.01); *B60C 2200/06* (2013.01); *C08K 3/04* (2013.01); *C08K 3/36* (2013.01); *C08K 5/01* (2013.01); *C08L 9/00* (2013.01); *C08L 25/06* (2013.01)

(58) Field of Classification Search
USPC ............... 152/209.1, 450; 524/526, 570, 571, 524/575.5
See application file for complete search history.

(56) References Cited

U.S. PATENT DOCUMENTS

| | | | |
|---|---|---|---|
| 5,901,766 A * | 5/1999 | Sandstrom et al. ........... 524/270 |
| 6,136,943 A | 10/2000 | Kawashima et al. |
| 6,214,919 B1 | 4/2001 | Schlademan et al. |
| 7,060,757 B2 * | 6/2006 | Hojo et al. .................. 525/333.1 |
| 7,084,228 B2 | 8/2006 | Labauze et al. |
| 7,649,043 B2 | 1/2010 | Bergman |
| 7,902,285 B2 | 3/2011 | Dumke et al. |
| 7,968,633 B2 | 6/2011 | York et al. |
| 7,968,634 B2 | 6/2011 | York et al. |
| 7,968,635 B2 | 6/2011 | York et al. |
| 7,968,636 B2 | 6/2011 | York et al. |
| 8,476,352 B2 * | 7/2013 | Rodgers et al. ............... 524/427 |
| 2004/0092644 A1 | 5/2004 | Labauze |
| 2004/0122157 A1 | 6/2004 | Labauze |
| 2010/0139825 A1 | 6/2010 | Hetzel |

FOREIGN PATENT DOCUMENTS

| | | |
|---|---|---|
| EP | 1 526 002 A1 | 4/2005 |
| EP | 1526002 A1 * | 4/2005 |
| EP | 1 589 068 A1 | 10/2005 |
| WO | WO 99/09036 A1 | 2/1999 |

OTHER PUBLICATIONS

EP 1526002 A1, Apr. 2005, Machine translation.*
http://en.necarbo.com/upload_en/hydrocarbon-resins-(2).pdf, Oct. 2014.*
International Search Report dated Nov. 11, 2011 of international application PCT/EP2011/068075 on which this application is based.

* cited by examiner

*Primary Examiner* — Satya Sastri
(74) *Attorney, Agent, or Firm* — Walter Ottesen P.A.

(57) ABSTRACT

A pneumatic tire for a commercial vehicle with a tread, wherein at least the part of the tread which comes into contact with the road contains a sulphur-vulcanized rubber mixture. The sulphur-vulcanized rubber mixture contains 90 to 50 phr (parts by weight, based on 100 parts by weight, of all of the rubbers in the mixture) of natural rubber, 10 to 50 phr of at least one polybutadiene having a glass transition temperature $T_g$ of −110 to −65° C. and 5 to 50 phr of at least one aliphatic and/or aromatic hydrocarbon resin having a softening point (ring and ball to ASTM E 28) of 0 to 150° C., and a mean molecular weight $M_n$ of less than 2000 g/mol and a polydispersity $D=M_w/M_n$ of 1 to 5.

11 Claims, No Drawings

PNEUMATIC TIRES FOR COMMERCIAL VEHICLES

CROSS REFERENCE TO RELATED APPLICATIONS

This application is a continuation application of international patent application FCT/EP2011/068075, filed Oct. 17, 2011, designating the United States and claiming priority from European application 10190627.9, filed Nov. 10, 2010, and the entire content of both applications is incorporated herein by reference.

FIELD OF THE INVENTION

The invention relates to a pneumatic tire for commercial vehicles, with a tread, where at least that part of the tread that comes into contact with the road is composed of a sulfur-rubber mixture.

BACKGROUND OF THE INVENTION

The running properties of a tire, in particular of a pneumatic tire, are greatly dependent on the rubber composition of the tread, and particularly stringent requirements are therefore placed upon the composition of the tread mixture. A wide variety of attempts have therefore been made to improve the properties of the tire by varying the polymer components and the fillers in the tread mixture. A factor that has to be taken into account here is that an improvement in one of the properties of the tire often has the concomitant effect of impairing another property. Among the properties that are correlated, where improvement of one of the properties is usually attended by impairment of at least one other property, are the trio comprising abrasion, rolling resistance and wet grip.

The use of polybutadiene (BR) in rubber mixtures for tire treads can by way of example improve abrasion performance, but this is achieved by reducing wet grip. Another factor important for tires for commercial vehicles, however, is gasoline consumption, and the tires should therefore have minimized rolling resistance. Improvements achieved in the field of tires for commercial vehicles, for example, in terms of abrasion, should therefore as far as possible be achieved at the same level of rolling resistance.

U.S. Pat. No. 6,136,943 has already disclosed that abrasion performance and wet grip of a pneumatic tire can be improved by using, for the tread, a rubber mixture comprising from 50 to 90 phr of a rubber with a glass transition temperature $T_g$ of from $-110$ to $-80°$ C. for example, polybutadiene, from 10 to 50 phr of a rubber with a glass transition temperature $T_g$ of from $-7.9$ to $+20°$ C., for example, ESBR, and from 15 to 50 phr of a resin selected from the group consisting of hydrocarbon resins, phenol/acetylene resins, colophony-derived resins, and mixtures of these.

U.S. Pat. No. 7,084,228 B2 discloses, for improving the abrasion performance of pneumatic tires, the use of resins in the tread mixture in combination with from 40 to 100 phr of a diene elastomer with a glass transition temperature $T_g$ of from $-65$ to $-10°$ C., for example, SSBR, and from 0 to 60 phr of a diene elastomer with a glass transition temperature $T_g$ of from $-110$ to $-80°$ C., for example polybutadiene.

U.S. patent application publications 2004/0092644 and 2004/0122157 have already disclosed the combination of specific resins with rubbers with low glass transition temperatures $T_g$ in tire tread mixtures for reducing abrasion in pneumatic tires.

The abovementioned specifications use polybutadiene as diene elastomer with a glass transition temperature $T_g$ of from $-110$ to $-80°$ C. The specifications do not explicitly disclose mixture constitutions that are usually used for treads of commercial vehicles.

EP 1 526 002 A1 discloses, for good ease of production, good durability, and good handling of pneumatic tires, a rubber mixture for the tread base which comprises at least one diene rubber, at least one filler, from 0.5 to 10 phr of at least one aromatic hydrocarbon resin, and from 1.5 to 10 phr of at least one fatty acid and/or metal salt of a fatty acid and/or fatty acid derivative. The examples reveal tread base mixtures with 70 phr of natural rubber, 30 phr of polybutadiene, and 2 phr of an aromatic hydrocarbon resin.

SUMMARY OF THE INVENTION

The invention is based on the object of providing pneumatic tires for commercial vehicles where the conflict between the objectives relating to abrasion, rolling resistance, and wet grip has been resolved at a higher level.

The object is achieved in the invention in that at least that part of the tread that comes into contact with the road is composed of a sulfur-vulcanized rubber mixture comprising
 from 90 to 50 phr (parts by weight, based on 100 parts by weight of all of the rubbers in the mixture) of natural rubber,
 from 10 to 50 phr of at least one polybutadiene with a glass transition temperature $T_g$ of from $-110$ to $-65°$ C. and
 from 5 to 50 phr of at least one aliphatic and/or aromatic hydrocarbon resin with a softening point (ring and ball in accordance with ASTM E28) of from 0 to 150° C. and with average molar mass $M_n$ of less than 2000 g/mol) and with a polydispersity $D=M_w/M_n$ of from 1 to 5.

The phr data (parts per hundred parts of rubber by weight) used in this specification are the conventional quantitative data used for mixture formulations in the rubber industry. The amount added of the individual substances in parts by weight here is always based on 100 parts by weight of the entire composition of all of the rubbers present in the mixture.

The specific combination of natural rubber with at least one polybutadiene with low glass transition temperature and at least one specific resin with the abovementioned properties, in the amounts mentioned, is successful in markedly improving the abrasion performance of a tread mixture, but at the same time the deterioration in wet grip usually detectable as a result of polybutadiene addition is not observed, and the rolling resistance of the resultant tire is low.

The rubber mixture for that part of the tread that comes into contact with the road comprises from 90 to 50 phr of natural rubber (NR), where this involves polyisoprene synthesized by a biochemical route in plants and having more than 99% cis-1,4 content.

The rubber mixture comprises, as other rubber, from 10 to 50 phr of at least one polybutadiene (BR) with a glass transition temperature $T_g$ of from $-110$ to $-65°$ C. Polybutadienes with glass transition temperatures within this range can by way of example be obtained via solution polymerization in the presence of catalysts of the rare-earth type.

The rubber mixture for the tread can also comprise, in addition to natural rubber and to the abovementioned polybutadienes, other types of rubber, for example, polybutadienes with higher glass transition temperatures, synthetic polyisoprene, styrene-butadiene copolymers (SBR), styrene-isoprene-butadiene terpolymers, isoprene-butadiene copolymers, butyl rubber, halobutyl rubber, or ethylene-propylenediene rubbers (EPDM). The other types of rubber here can also be present in functionalized form.

It has been found to be particularly advantageous in respect of wet grip, abrasion, and rolling resistance if the rubber mixture of the tread comprises from 80 to 55 phr of natural rubber and from 20 to 45 phr of at least one polybutadiene with a glass transition temperature $T_g$ of from −110 to −65° C.

In an advantageous embodiment of the invention, the at least one polybutadiene has a glass transition temperature $T_g$ of from −110 to −85° C.

The rubber mixture for that part of the tread that comes into contact with the road comprises from 5 to 50 phr, preferably from 5 to 25 phr, of at least one aliphatic and/or aromatic hydrocarbon resin with a softening point (ring and ball in accordance with ASTM E28) of from 0 to 150° C. and with an average molar mass $M_n$ of less than 2000 g/mol, and with a polydispersity $D=M_w/M_n$ of from 1 to 5. However, it is also possible to use a plurality of resins in a mixture.

The aliphatic and/or aromatic hydrocarbon resin is preferably one selected from the group consisting of terpene resins, $C_5$-resins, $C_9$-resins, coumarone-indene resins, and dicyclopentadiene (DCPD) resins, aromatic resin produced from α-methylstyrene, and copolymers of the monomers of these types of resin. Resins that are not suitable in the invention are polar resins, such as phenolic resins, which do not bring about any abrasion improvement.

$C_5$-resins and $C_9$-resins are hydrocarbon resins based on various, $C_5$-monomers and, respectively, $C_9$-monomers.

In one preferred embodiment of the invention, the hydrocarbon resin involves aromatic hydrocarbon resin, preferably an aromatic resin produced from α-methylstyrene. These resins bring about particularly good abrasion performance.

The rubber mixture can comprise fillers, and it is possible here to use a very wide variety of fillers known to the person skilled in the art, for example carbon black, silica, aluminosilicates, chalk, starch, magnesium oxide, titanium dioxide, or rubber gels.

In order to optimize abrasion and ultimate tensile strength properties for the pneumatic tires for commercial vehicles, it has proven to be advantageous for the rubber mixture of the tread to comprise less than 60 phr, in particular less than 50 phr, of silica.

The silicas can involve the conventional silicas for tire-rubber mixtures. It is particularly preferable to use a fine-particle, precipitated silica which has a nitrogen surface area (BET surface area) (in accordance with DIN-66131 and 66132) of from 35 to 350 m²/g, preferably from 145 to 270 m²/g, and a CTAB surface area (in accordance with ASTM D3765) of from 30 to 350 m²/g, preferably from 100 to 285 m²/g. Silicas of this type give, by way of example in rubber mixtures for tire treads, particularly good physical properties of the vulcanisates. Furthermore, advantages in the processing of the mixture can be obtained via reduction of mixing time for identical product properties, these therefore giving improved productivity. Examples of silicas that can be used are therefore not only VN3 (trade name) silicas from Degussa but also high-dispersability silicas, known as HP silicas (for example, Ultrasil 7000 from Degussa).

In order to improve processability, and in order to couple the silica and any other polar fillers that may be present to the diene rubber, rubber mixtures can use silane coupling agents. The silane coupling agents react with the silanol groups on the surface of the or with other polar groups during the mixing of the rubber or of the rubber mixture (in situ) or even before addition of the filler to the rubber, in the manner of a pretreatment (premodification). Silane coupling agents that can be used here are any of the silane coupling agents known to the person skilled in the art for use in rubber mixtures. Coupling agents of this type known from the prior art are bifunctional organosilanes which have at least one alkoxy, cyclo-alkoxy, or phenoxy group as leaving group on the silicon atom, and which have, as other functionality, a group which, where appropriate after cleavage, can enter into a chemical reaction with the double bonds of the polymer. The last-mentioned group can by way of example involve the following chemical groups: —SCN, —SH, —NH$_2$, or —S$_x$-(where x=from 2 to 8). An example of a silane coupling agent that can be used is therefore 3-mercaptopropyltriethoxysilane, 3-thio-cyanato-propyltrimethoxysilane, or 3,3'-bis(triethoxy-silylpropyl) polysulfides having from 2 to 8 sulfur atoms, for example, 3,3'-bis(triethoxysilylpropyl) tetrasulfide (TESPT), the corresponding disulfide, or else a mixture of the sulfides having from 1 to 8 sulfur atoms with different contents of the various sulfides. TESPT can by way of example also be added here in the form of a mixture with industrial carbon black (trade name XSOS from Degussa). Other silane coupling agent that can be used are blocked mercaptosilanes, for example those disclosed in WO 99/09036. It is also possible to use silanes such as those described in U.S. Pat. Nos. 7,968,633; 7,968,636; 7,968,635; and, 7,968,634. It is possible by way of example to use silanes marketed in various variants with the name NXT by Momentive Performance Materials, USA, or those marketed with the name VP Si 363 by Evonik Industries, Germany.

The amounts used of the silane coupling agents are from 0.2 to 30 parts by weight, preferably from 1 to 15 parts by weight, based on 100 parts by weight of filler, in particular silica, since this then permits ideal coupling of the filler to the rubber(s).

For optimized properties in commercial-vehicle use in relation to ultimate tensile strength and to tear propagation, in one preferred embodiment of the invention, the rubber mixture that part of the tread that comes into contact with the road comprises, as filler, from 30 to 60 phr, preferably from 45 to 55 phr, of carbon black, for example, carbon blacks which are within the 100 or 200 group in accordance with the ASTM classification, for example N121 carbon black.

The rubber mixture for the tread can also comprise additional substances other that the substances mentioned, for example plasticizers (for example, aromatic, naphthenic, or paraffinic mineral oil plasticizers, MES (mild extraction solvate), RAE oils, TDAE (treated distillate aromatic extract), oils based on renewable raw materials (for example, rapeseed oil or factices), the materials known as biomass to liquid (BTL) oils (as disclosed in the application with application number DE 10 2008 035 962.9), or liquid polymers (for example, liquid polybutadiene)).

The rubber mixture for the tread can moreover comprise conventional parts by weight of conventional additional substances. Among the additional substances are antioxidants, for example, N-phenyl-N'-(1,3-dimethylbutyl)-p-phenylenediamine (6PPD), N-isopropyl-N'-phenyl-p-phenylenediamine (IPPD), 2,2,4-trimethyl-1,2-dihydro-quinoline (TMQ), and other substances, such as those disclosed by way of example in J. Schnetger, Lexikon der Kautschuktechnik [Encyclopedia of rubber technology], 2nd edition, Hüthig Buch Verlag, Heidelberg, 1991, pp. 42-48, activators, for example, fatty acids (for example, stearic acid), waxes, resins, and mastication aids, for example, 2,2'-dibenzamidodiphenyl disulfide (DBD).

The vulcanization process is carried out in the presence of sulfur or of sulfur donors, and some sulfur donors can simultaneously act as vulcanization accelerators here. Sulfur or sulfur donors are added to the rubber mixture in the final mixing step, in the amounts familiar to the person skilled in the art (from 0.4 to 4 phr, preferred amounts for sulfur being from 1.5 to 2.5 phr).

The rubber mixture for the tread can moreover comprise substances that influence vulcanization, for example vulcanization accelerators, vulcanization retarders, and vulcanization activators, in conventional amounts, in order to control the time required and/or the temperature required for the vulcanization process, and to improve vulcanisate properties. The vulcanization accelerators here can by way of example be those selected from the following accelerator groups: thiazole accelerators, for example, 2-mercaptobenzothiazole, sulfenamide accelerators, for example, benzothiazyl-2-cyclo-hexyl-sulfenamide (CBS), guanidine accelerators, for example, N,N'-diphenylquanidine (DPG), dithiocarbamate accelerators, for example, zinc dibenzyldithiocarbamate, disulfides, thiophosphates: thiuram accelerators. The accelerators can also be used in combination with one another, whereupon synergistic effects can be obtained.

The rubber mixture for that part of the tread that comes into contact with the road is produced conventionally, the general method being first to use one or more mixing stages to produce a parent mixture which comprises all of the constituents except for the vulcanization system (sulfur and vulcanization-influencing substances), and then to produce the finished mixture by adding the vulcanization system. The mixture is then further processed, for example, via an extrusion procedure, and converted to the appropriate form of a green tread. The green tread is applied in a known manner during production of the green pneumatic tire for commercial vehicles. However, the tread can also be wound in the form of a narrow strip of rubber mixture onto a green tire which by this stage comprises all of the tire components except for the tread. Once the green tire for commercial vehicles has been manufactured, it is vulcanized in a vulcanization mold. The resultant tires for commercial vehicles feature a low abrasion value with low rolling resistance and good wet grip.

DESCRIPTION OF THE PREFERRED EMBODIMENTS OF THE INVENTION

The invention will now be explained in more detail with reference to comparative and inventive examples, collated in Table 1.

In all of the mixture examples in the tables, the quantitative data stated are parts by weight, based on 100 parts by weight of all of the rubber (phr). The comparative mixtures are indicated by C, and the mixtures for the inventive pneumatic tires for commercial vehicles are indicated by I. Mixture 1 (C) is a tire tread mixture without resin. Mixtures C (4) to C (9) are comparative mixtures which comprise styrene-butadiene copolymers instead of natural rubber. In the mixtures comprising resin, the fill level, and also the amounts of sulfur and accelerator, were adjusted appropriately in order to provide mixtures of almost identical hardness, that is, in order to compensate the "dilution" due to the resin.

The mixtures were produced under conventional conditions in a plurality of stages in a laboratory tangential mixer. Test specimens were produced from all of the mixtures via 20 minutes of vulcanization under pressure at 160° C., and the test methods stated below were used on these test specimens to determine typical rubber-industry properties of the materials.

Shore A hardness at room temperature in accordance with DIN 53 505

Rebound resilience at room temperature and 70° C. in accordance with DIN 53 512

Tensile strength at room temperature in accordance with DIN 53 504

Elongation at break at room temperature in accordance with DIN 53 504

Modulus at 50 and 300% elongation at room temperature in accordance with DIN 53 504.

Graves tear-propagation resistance at room temperature in accordance with DIN 53 504

Loss factor tan $\delta_{max}$ at 55° C. as maximum value over the elongation sweep from dynamic-mechanical measurement in accordance with DIN 53 513

Abrasion at room temperature in accordance with DIN 53516.

TABLE 1

|  | Unit | 1(C) | 2(I) | 3(I) | 4(C) | 5(C) | 6(C) | 7(C) | 8(C) | 9(C) |
|---|---|---|---|---|---|---|---|---|---|---|
| Constituents |  |  |  |  |  |  |  |  |  |  |
| Natural rubber | phr | 60 | 60 | 60 | 0 | 0 | 0 | 0 | 0 | 0 |
| Polybutadiene$^a$ | phr | 40 | 40 | 40 | 40 | 40 | 40 | 40 | 40 | 40 |
| SSBR$^b$ | phr | 0 | 0 | 0 | 60 | 60 | 60 | 0 | 0 | 0 |
| ESBR$^c$ | phr | 0 | 0 | 0 | 0 | 0 | 0 | 60 | 60 | 60 |
| N121 carbon black | phr | 45 | 50 | 50 | 45 | 50 | 50 | 45 | 50 | 50 |
| C$_5$-resin$^d$ | phr | 0 | 0 | 14 | 0 | 0 | 14 | 0 | 0 | 14 |
| Arom. resin$^e$ | phr | 0 | 14 | 0 | 0 | 14 | 0 | 0 | 14 | 0 |
| Antioxidant | phr | 3 | 3 | 3 | 3 | 3 | 3 | 3 | 3 | 3 |
| Antiozonant wax | phr | 2 | 2 | 2 | 2 | 2 | 2 | 2 | 2 | 2 |
| Zinc oxide | phr | 3 | 3 | 3 | 3 | 3 | 3 | 3 | 3 | 3 |
| Stearic acid | phr | 2 | 2 | 2 | 2 | 2 | 2 | 2 | 2 | 2 |
| Accelerator | phr | 1.3 | 1.4 | 1.4 | 1.3 | 1.4 | 1.4 | 1.3 | 1.4 | 1.4 |
| Sulfur | phr | 1.3 | 1.4 | 1.4 | 1.3 | 1.4 | 1.4 | 1.3 | 1.4 | 1.4 |
| Properties |  |  |  |  |  |  |  |  |  |  |
| Shore A hardness at RT | Shore A | 63 | 60 | 60 | 65 | 62 | 63 | 63 | 59 | 61 |
| Rebound resilience at RT | % | 55 | 48 | 46 | 47 | 41 | 41 | 44 | 39 | 38 |

TABLE 1-continued

|  | Unit | 1(C) | 2(I) | 3(I) | 4(C) | 5(C) | 6(C) | 7(C) | 8(C) | 9(C) |
|---|---|---|---|---|---|---|---|---|---|---|
| Rebound resilience at 70° C. | % | 64 | 61 | 60 | 57 | 52 | 51 | 54 | 51 | 49 |
| Tensile strength at RT | MPa | 21.8 | 22.0 | 20.7 | 19.3 | 19.5 | 18.9 | 19.9 | 20.1 | 18.6 |
| Elongation at break at RT | % | 464 | 532 | 522 | 499 | 527 | 544 | 489 | 555 | 547 |
| 50% modulus | MPa | 1.5 | 1.3 | 1.2 | 1.4 | 1.4 | 1.4 | 1.4 | 1.2 | 1.2 |
| 300% modulus | MPa | 13.2 | 11.1 | 10.5 | 10.2 | 9.8 | 9.2 | 11.2 | 9.4 | 9.1 |
| Tear-propagation resistance | N/mm | 46 | 50 | 48 | 34 | 33 | 32 | 29 | 36 | 32 |
| tan $\delta_{max}$ at 55° C. | — | 0.120 | 0.139 | 0.142 | 0.174 | 0.190 | 0.202 | 0.184 | 0.195 | 0.215 |
| Abrasion value | mm$^3$ | 14 | 19 | 24 | 39 | 36 | 23 | 36 | 43 | 32 |

[a]High-cis polybutadiene, $T_g$ = −105° C.
[b]solution-polymerized styrene-butadiene copolymer, styrene content: 25% by weight, vinyl content about 11%, $T_g$ = −69° C.
[c]emulsion-polymerized styrene-butadiene copolymer, styrene content: 23.5% by weight, vinyl content about 16%, $T_g$ = −55° C.
[d]aliphatic C$_5$-resin, softening point about 100° C., $M_n$ = 1200 g/mol, D = 2.9, Escorez 1102, ExxonMobil Central Europe Holding GmbH
[e]aromatic resin made of α-methylstyrene, softening point about 85° C., $M_n$ = 648 g/mol, D = 1.88, Sylvares SA 85, Arizona Chemical Table 1 shows that the combination of natural rubber with polybutadiene and resin gives a mixture which gives, in the tire, a low abrasion value (see DIN abrasion), low rolling resistance, reflected in high rebound resilience at 70° C. and a low loss factor tan $\delta_{max}$ at 55° C., and good wet grip, reflected in low rebound resilience at room temperature. If styrene-butadiene copolymers are used instead of the natural rubber (mixtures 4 (C) to 9 (C)), poorer values are seen in respect of rolling resistance and of abrasion.

It is also notable that mixtures 2 (I) and 3 (I) feature high tear-propagation resistance, which leads to greater durability especially in tires for commercial vehicles, since cracks in the tread are not so quick to reach the steel cord belt, which is susceptible to corrosion.

As shown by mixture 2 (I), particularly good abrasion values are achieved with aromatic hydrocarbon resins.

It is understood that the foregoing description is that of the preferred embodiments of the invention and that various changes and modifications may be made thereto without departing from the spirit and scope of the invention as defined in the appended claims.

What is claimed is:

1. A pneumatic tire for commercial vehicles, with a tread, where at least a part of the tread that comes into contact with the road is composed of a sulfur-vulcanized rubber mixture comprising:
   from 80 to 55 phr of a natural rubber;
   from 20 to 45 phr of at least one polybutadiene with a glass transition temperature $T_g$ of from −110 to −65° C.; and,
   from 5 to 50 phr of at least one hydrocarbon resin with a softening point (ring and ball in accordance with ASTM E28) of from 0 to 150° C., with an average molar mass $M_n$ of less than 2000 g/mol, and with a polydispersity D=$M_w/M_n$ of from 1 to 5.

2. The pneumatic tire for commercial vehicles, as claimed in claim 1, wherein the at least one polybutadiene has a glass transition temperature $T_g$ of from −110 to −85° C.

3. The pneumatic tire for commercial vehicles, as claimed in claim 1, wherein the at least one hydrocarbon resin is selected from the group consisting of terpene resins, C$_5$-resins, C$_9$-resins, coumarone-indene resins, dicyclopentadiene (DCPD) resins, and aromatic resin produced from α-methylstyrene, or copolymers thereof.

4. The pneumatic tire for commercial vehicles, as claimed in claim 3, wherein the at least one hydrocarbon resin is an aromatic hydrocarbon resin.

5. The pneumatic tire for commercial vehicles, as claimed in claim 4, wherein the aromatic hydrocarbon resin is a resin produced from α-methylstyrene.

6. The pneumatic tire for commercial vehicles, as claimed in claim 1, wherein the rubber mixture of the tread comprises from 5 to 25 phr of the at least one hydrocarbon resin.

7. The pneumatic tire for commercial vehicles, as claimed in claim 1, wherein the rubber mixture of the tread comprises less than 60 phr of silica.

8. The pneumatic tire for commercial vehicles, as claimed in claim 1, wherein the rubber mixture of the tread comprises from 30 to 60 phr of carbon black.

9. The pneumatic tire for commercial vehicles, as claimed in claim 4, wherein the at least one hydrocarbon resin is an aliphatic hydrocarbon resin.

10. The pneumatic tire for commercial vehicles, as claimed in claim 7, wherein the rubber mixture of the tread comprises less than 50 phr of silica.

11. The pneumatic tire for commercial vehicles, as claimed in claim 8, wherein the rubber mixture of the tread comprises from 45 to 55 phr of carbon black.

* * * * *

UNITED STATES PATENT AND TRADEMARK OFFICE
CERTIFICATE OF CORRECTION

PATENT NO. : 9,034,980 B2  
APPLICATION NO. : 13/867483  
DATED : May 19, 2015  
INVENTOR(S) : C. Recker et al.

It is certified that error appears in the above-identified patent and that said Letters Patent is hereby corrected as shown below:

In the Specification,

In Column 1:  
Line 18: add -- vulcanized -- after "sulfur-".  
Line 52: delete "-7.9" and substitute -- -79 -- therefor.

In Column 2:  
Line 34: add -- an -- before "average".  
Line 34: delete "g/mol)" and substitute -- g/mol, -- therefor.

In Column 3:  
Line 57: delete "HP" and substitute -- HD -- therefor.  
Line 63: add -- silica -- before "or".

In Column 4:  
Line 19: delete "XSOS" and substitute -- X50S -- therefor.  
Line 19: delete "agent" and substitute -- agents -- therefor.  
Line 36: add -- for -- after "ture".  
Line 42: delete "that" and substitute -- than -- therefor.

In Column 5:  
Line 11: delete "groups;" and substitute -- groups: -- therefor.  
Line 15: delete "N,N'-diphenylquanidine" and substitute -- N,N'-diphenylguanidine -- therefor.  
Line 17: delete "thiophosphates:" and substitute -- thiophosphates, -- therefor.

In Column 6:  
Line 34: delete "504" and substitute -- 515 -- therefor.

Signed and Sealed this  
Fifteenth Day of September, 2015

Michelle K. Lee  
*Director of the United States Patent and Trademark Office*

CERTIFICATE OF CORRECTION (continued)
U.S. Pat. No. 9,034,980 B2

In the Claims,

<u>In Column 8</u>:
Line 51: delete "claim 4," and substitute -- claim 3, -- therefor.